United States Patent [19]

Lewin et al.

[11] 4,066,387
[45] Jan. 3, 1978

[54] METHOD OF IMPROVING THE SORPTION CAPACITY OF POLYMERS

[75] Inventors: Menachem Lewin; Hilda Guttmann, both of Jerusalem, Israel

[73] Assignee: The State of Israel Ministry of Commerce and Industry, Jerusalem, Israel

[21] Appl. No.: 661,926

[22] Filed: Feb. 27, 1976

[30] Foreign Application Priority Data

Mar. 26, 1975 Israel .................................. 46937

[51] Int. Cl.$^2$ ........................ D06P 5/00; B05D 3/04
[52] U.S. Cl. ............................................. 8/4; 8/166; 260/2.5 FP; 260/2.5 HA; 260/2.5 HB; 260/2.5 N; 427/245; 427/322; 427/343; 427/373; 428/311
[58] Field of Search ............... 427/243, 244, 245, 444, 427/307, 322, 301, 373, 343; 8/180, DIG. 9, 115.5, 4, 166; 260/2.5 HA, 2.5 BD, 96 HA, 2.5 B; 264/54, DIG. 5, DIG. 13; 428/277, 921, 311

[56] References Cited

U.S. PATENT DOCUMENTS 2,913,424  11/1959  Gumboldt et al. ............ 260/2.5 HA
3,215,486  11/1965  Hada et al. .................... 260/2.5 HA

FOREIGN PATENT DOCUMENTS 710,232    1965  Canada ..................................... 8/180
1,517,389  1968  France ................................... 427/243

Primary Examiner—Ronald H. Smith
Assistant Examiner—Evan K. Lawrence
Attorney, Agent, or Firm—Ladas, Parry, Von Gehr, Goldsmith & Deschamps

[57] ABSTRACT

A method of improving the sorption capacity of a substantially hydrophobic, thermoplastic polymer, which comprises introducing into the polymer a halogen by contacting the polymer with a solution containing the halogen under conditions which avoid chemical reaction of the halogen with the polymer, separating the free halogen-containing polymer from the solution, and contacting the polymer with a reagent which pervades the polymer and reacts with the free halogen contained therein so as to produce a gas as one of the reaction products. The product polymers have increased sorption capacity and improved dyeability and are capable of sorbing and retaining useful substances such as medicaments, pesticides and perfumes.

15 Claims, No Drawings

METHOD OF IMPROVING THE SORPTION CAPACITY OF POLYMERS

BACKGROUND OF THE INVENTION

The present invention relates to a method of improving the sorption capacity of a substantially hydrophobic, thermoplastic polymer.

SUMMARY OF THE INVENTION

The polymers treated in accordance with the method of the invention were surprisingly found to possess a considerably enhanced capacity, as compared with the corresponding untreated polymers, to sorb a wide range of substances, including gases, liquids, solutes and suspended solid particles. This improved sorption capacity manifests itself by the increased rate and yield of the sorption of said substances as well as their increased retention by the polymer. The improved sorptive properties of the polymers obtained by the method of the invention can be measured, e.g. by their uptake of dyestuffs from aqueous or non-aqueous solutions, by their water regain and the like.

The novel method of the invention and the polymers obtained thereby are useful in numerous areas of application where sorptive properties of polymers are utilised. Furthermore, it has been found in many cases that, say, sheets or films of polymers treated in accordance with the method of the invention, exhibited changed permeabilities towards certain gases or solutes. Such polymers may usefully be applied in, e.g., ultra-filtration processes for industrial waste purification, water desalination, medical dialysis or the like.

One important use of the invention is in the textile industry, in particular in the dyeing of hydrophobic synthetic fibers which has hitherto involved serious difficulties, requiring the use of high temperatures, high pressures and various dye carriers and auxiliaries. It has further been found in many cases that, in addition to their improved sorptive properties, the polymers treated in accordance with the invention also undergo other changes which are advantageous for their use in the textile industry. These are, inter alia, a certain increase in bulk, increased water regain which makes for better comfort in textile garments, increased covering power and improved hand and feel.

The invention provides a method for improving the sorption capacity of a substantially hydrophobic, thermoplastic polymer, which comprises:

a. introducing into said polymer a halogen selected from the group containing of $Cl_2$, $Br_2$, $I_2$, ClBr, ClI and BrI by contacting the polymer with a solution containing said halogen under conditions which avoid chemical reaction of said halogen with said polymer;

b. separating the free halogen containing polymer from said solution; and c. contacting it with a reagent capable of pervading the polymer and reacting with the free halogen contained therein so as to produce a gas as one of the reaction products, thereby producing said gas.

DESCRIPTION OF THE PREFERRED EMBODIMENTS

In accordance with the first stage of the method of the present invention, the polymer is contacted with a solution containing elementary chlorine, bromine, iodine or mixtures thereof, thereby to introduce the halogen into the polymer. The progress of the halogen introduction can be followed by the colour changes of the polymer which, if originally colourless, gradually acquires the colour of the introduced halogen, i.e., yellow-green in the case of chlorine and red-brown in the case of bromine. This process, which for certain hydrophobic polymers is the subject of our copending Israel patent application No. 46936 can be pictured as a solution or sorption of the halogen in the polymer, although its exact mechanism is not known. The process may thus be discussed in terms of distribution or partition of the free halogen in the two-phase system comprising the halogen solution and the polymer. A partition coefficient can be ascribed to each specific system and this will determine the rate and degree of the halogen introduction into the polymer.

Aqueous solutions of chlorine and/or bromine are preferred for the first step of the method of the invention, because they provide higher partition coefficients and therefore enhance the rate and the degree of the halogen introduction into the polymer. As will be explained hereinbelow, one of the factors determining the increase in the sorption capacity of the treated polymer is, as a rule, the amount of halogen introduced thereinto in the first stage of the method of the invention.

It has also been found that the rate of chlorine and bromine introduction into the polymer in the first stage of the method of the invention, increases if the pH of the aqueous halogen containing solution is decreased, e.g., by the addition of inorganic acids such as hydrochloric or hydrobromic acids. The preferred pH is in the range of about 0 to 3, more preferably 0 to 1. Similar increases in rate were also observed when the halogen solution contained considerable concentrations of the corresponding halide ions.

It should also be noted that although the use of bromine appears in many cases to yield somewhat better results than chlorine, the difference between the two halogens is not very considerable and therefore chlorine would be preferred in most cases for use in the method of the invention, because it is less corrosive, less hazardous and cheaper.

In the second stage of the process according to the invention, the free halogen containing polymer is separated from the solution, preferably freed from any residual traces of solution adhering thereto, and in the third stage contacted with a reagent which fulfills the two essential requirements of:

a. being able to pervade the halogen containing polymer; and b. capable of reacting with the free halogen so as to form, as one of the reaction products, a gas.

Suitable reagents are, primarily, reducing agents which reduce the elementary halogen to halide, the reagent being oxidized thereby to form one or more products at least one of which is a gas at the operating temperatures and pressures. The gas forming reagents may themselves be in the gaseous state or they may be liquids, optionally in admixture with a suitable solvent. Other gas forming reagents which are normally solid are used in the form of their solution in a solvent.

As in the first stage of the method of the invention, water is the preferred solvent also in the third stage.

Examples of gas forming reagents suitable for use in the method of the invention are those which form nitrogen, such as ammonia, ammonium hydroxide, hydrazine, nitric acid and nitrous acid; those forming carbon dioxide, such as formic acid and those which form oxygen, such as hydrogen peroxide and its reactive derivative, preferably in aqueous solutions, and also those capable of forming sulfur dioxide, sulfur trioxide or hydrogen chloride, such as sulfurous acid and its salts, hydrogen sulfide and its salts, as well as hydrogen sulfide-producing reagents, such as mercaptans.

Ammonia (or ammonium hydroxide) and formic acid are the preferred reagents, because they are readily available, relatively cheap and simple to handle.

The course and the completion of the third stage of the method according to the invention can be followed by observing the fading and eventual disappearance of the colour assumed by the polymer upon introduction of the halogen thereinto. It has thus been found (and corroborated by subsequently measuring the sorption capacity of the polymer) that the reaction in this third stage is relatively fast and in many cases the reaction is completed in a few minutes. For example, samples of polyethylene terephthalate which had been immersed in a saturated aqueous bromine solution for 30 minutes, were completely decolourized after being immersed in 25% aqueous ammonia for 20 to 60 seconds.

Upon completion of the third stage of the method of the invention, the polymer is removed from contact with the gas forming reagent and preferably washed free of the excess of the reagent and of the non-gaseous reaction products. Where necessary, the polymer is then dried by conventional methods.

Microscopic examinations of the polymers treated in accordance with the invention revealed the formation inside the polymer of voids or bubbles and pores of various shapes, some, though not all, of which were readily visible at a magnification of 1000X. Thus, photomicrographs taken at a magnification of 10,500X of cross sections of the treated polymers showed a large number of longitudinal, cylindrical voids, which can also be described as microcapillary tracts. Some of the voids extended to, or almost to, the surface of the treated polymer, where they terminated either in open pores or in closed bubble-like protrusions.

It has also been found that a correlation existed between the density of the voids formed in the polymer as a result of the method of the invention and the increase in the sorption capacity of the so treated polymer. It was further found, in cases where ammonia was used as the gas forming reagent, that the density of the voids, i.e. the number of voids per unit volume of the polymer, was a function of both the amount of halogen introduced into the polymer in the first stage of the process and the concentration of the ammonia in the aqueous solution with which the polymer had been contacted in the third stage of the process.

In accordance with one embodiment of the invention, the third stage of the process is carried out at an elevated temperature, e.g. between 50° and 80° C. Alternatively, the polymer can be submitted for a predetermined time to an elevated temperature, after the completion of the third stage of the process. In both these cases it has been found that the sorption capacity of the treated polymer was further increased as a result of the heat treatment.

Without limiting the invention by theoretical considerations, it might be observed that the above mentioned findings suggest that the beneficial results of the method of the invention, i.e. the improvement of the sorptive properties of the treated polymers, are due to changes in their physical microstructure, namely, their increased or acquired porosity. The mechanism of these changes might be pictured as follows:

The gas forming reagent which penetrates into the polymer reacts rapidly, in situ, with the free halogen contained therein. The gas is formed in this reaction at a considerable pressure which, in many cases, is further increased by the exothermicity of the reaction. The expansion of the gas creates the observed bubbles or voids and those which reach the surface of the polymer may burst to form the open pores. The further increase of the sorption capacity of the polymer after it is heated in accordance with the aforesaid embodiment of the invention, may be explained by the expansion of the gas confined in the closed voids or bubbles causing some of them to burst, thus increasing the number of open pores. This explanation is supported by a comparison of photomicrographs (at magnification 10,500X) taken before and after the treated polymer was exposed to heat.

The novel method of the present invention is applicable to a wide variety of substantially hydrophobic thermoplastic polymers which include, but are not limited to, polyolefins (such as polyethylene, polypropylene, polyisobutylene and the like), substituted polyolefins (such as polystyrene, polyacrylonitrile, polyacrylates, polymethacrylates, polyvinyl chloride, polyvinylidene chloride, polytetrafluoroethylene), polyesters (such as polyethylene terephthalate and the like), polyamides (such as polyhexamethylene adipamide), polyimides (such as polycaprolactam), cellulose esters (e.g. cellulose triacetate) etc. Also included are copolymers and ternary polymers of the aforementioned types and many other synthetic and natural polymers, elastomers and plastomers. Also included are graft and block polymers of polyolofins, polyesters, polystyrene, polyacrylonitrile, polycaprolactam, polyhexamethylene adipamide, polyvinyl chloride, polyvinylidene chloride and cellulose triacetate.

In the cases where polymers are used which are potentially susceptible to chemical attack by elementary halogen in the presence of light, such attack can be avoided by carrying out the reaction in the absence of light. An example is polystyrene, the aromatic nuclei of which may undergo light catalyzed halogen substitution reactions, e.g. bromination with elementary bromine.

The novel method of the invention can be applied to any of the aforementioned polymers substantially in any desired physical form. The polymers may thus be in the form of fibers, filaments, woven non-woven or knitted fabrics, granules, powders, pellets, films, sheets, molded articles and the like.

As stated above, an important application of the invention is in the dyeing of synthetic fibers, yarns, fabrics and sheets. It is well known that synthetic textiles of, e.g., polyethylene, polypropylene or polyester (polyethylene terephthalate) are difficultly dyable, particularly in the aqueous dispersed dye and basic dye systems which are widely used for other types of textile. Hitherto, polyethylene and polypropylene could merely be stained, while polyesters required high temperatures, high pressures and the use of dye carriers, for acceptable dye uptake.

It has now been found that polyethylene, polypropylene and polyester textile materials, for example, after being treated in accordance with the invention, can be successfully dyed to deep shades with conventional aqueous dispersed dye systems, at comparatively low temperatures and at atmospheric pressure. There is, further, no need to use dye assisting agents for dyeing these treated polymers, although such agents can be used where additional colour effects are desired.

According to a further embodiment of the invention, the enhanced sorption capacity of the polymers obtained by the method of the invention, can be utilized for sorbing on the polymers one or more substances selected from a wide variety of useful materials. The sorbed materials can be gases, liquids or solids and can be sorbed on the polymers, treated in accordance with the invention, by contacting the polymer therewith or with solutions or dispersions thereof. Examples of substances which may usefully be introduced into the polymer are perfumes, bactericides, bacteriostats, soaps, detergents, drugs, pharmaceuticals, enzymes, deodorants, humectants, water, oils, neutralizing agents for clothing, explosives, poison gas, magnetic metal powder. It is also possible to contact the treated polymer with at least one substance to sorb the substance on the polymer wherein the substance is capable by itself or by reaction with other substances of chemical conversion in situ into a desired property imparting material. For example, it is possible to introduce into the treated polymers one or more reactants and to cause them to react with another reactant (or with each other) in the sorbed state so as to produce a useful product, e.g., a bactericide. Similarly, it is possible to introduce into the polymers a monomer-catalyst system in order to obtain polymerization of the monomer in the sorbed state.

Many of the aforementioned substances cannot be sorbed at all on hydrophobic thermoplastic polymers which had not been treated in accordance with the invention, or if a certain sorption occurs, the substances are not retained by the untreated polymers and are, e.g., lost by washing. In line with the non-limiting mechanism suggested hereinbefore, it is assumed that the aforesaid sorbed substances are primarily introduced into, and retained in, the pores or voids of the polymers treated in accordance with the invention. This would also explain the fact that the retention of the sorbed materials by the polymers can be increased by heating the polymer containing the sorbed material, thereby assumedly causing pores containing the sorbed material to close.

The invention is illustrated by the following Examples, without being limited thereto.

EXAMPLE 1

Samples of undyed knitted polyester (polyethylene terephthalate) fabric, 20 cm × 20 cm × 0.36 mm in size, were immersed, at room temperature, in aqueous solutions containing elementary chlorine and bromine in variable concentrations and for variable contact times as indicated in Table 1 hereinbelow. The samples were removed from the halogen solutions, briefly drained and then immersed in a 25-28% aqueous ammonia solution until the samples became substantially decolorized (in about 20 seconds).

The samples were then washed free of the residual aqueous solution of ammonia and ammonium salts and air dried.

The thus treated polyester fabric samples were then immersed in a dye bath containing "Palanyl Brilliant Rot BEL", a commercially available dye manufactured by the BASF company for dyeing polyester fabrics. The polyester fabric samples were dyed according to the instructions issued by the manufacturer of the dye, at a 1.5% concentration (based on the textile) for one hour at 100° C.

The results of the dyeing experiments are reported in Table 1 below wherein they are compared to results obtained with a blank sample of the same fabric, which had not been submitted to treatment with halogen followed by ammonia, in accordance with the invention. Table 1 also includes results of dyeing experiments carried out in accordance with the above described procedure but with the addition to the dye bath of 0.6 g/l of a conventional dye carrier "Levergal" which is recommended for use in the dyeing of polyester fabrics.

The results in Table 1 clearly show the improved dyeability of the fabrics treated in accordance with the present invention. It can also be seen that the higher the concentration of the chlorine or bromine in the treat solutions and the longer the contact times, i.e. the higher the amount of halogen introduced into the polymer in the first step of the treatment according to the invention, the better the results obtained. The data in the Table also show that a dye carrier can usefully be employed yielding a further improvement of the colour properties.

TABLE 1

| Halogen Concentration in Normality | Exposure Time in Minutes | % Dye in[a] Fabric | Dye Uptake Ratio to Blank | Luminescence[b] | Color Purity[c] |
|---|---|---|---|---|---|
| Blank | 0 | 8.7 | 1 | 38.6 | 21.0 |
| 0.1N Bromine | 3 | 27.3 | 3.14 | 27.35 | 35.0 |
| 0.1N Bromine | 5 | 28.6 | 3.29 | 25.05 | 37.6 |
| 0.2N Bromine | 5 | 31.8 | 3.06 | 22.5 | 38.3 |
| 0.2N Bromine | 10 | 36.0 | 4.15 | 22.75 | 40.0 |
| 0.2N Bromine | 30 | 49.0 | 5.65 | 22.90 | 43.0 |
| 0.4N Bromine | 3 | 45.3 | 4.31 | 21.85 | 39.8 |
| 0.4N Bromine | 5 | 45.3 | 5.21 | 19.85 | 40.5 |
| 0.4N Bromine | 10 | 54.0 | 6.21 | 20.30 | 41.5 |
| 0.4N Bromine | 30 | 65.8 | 7.50 | 18.20 | 48.2 |
| Dyeings with added conventional dye carrier - Levergal (0.6 g/l of dye bath): | | | | | |
| Blank | 0 | 17.2 | 1 | 29.4 | 33.8 |
| 0.1N Bromine | 3 | 44.0 | 2.55 | 21.3 | 44.0 |
| 0.1N Bromine | 5 | 47.5 | 2.75 | 20.3 | 47.5 |
| 0.1N Bromine | 10 | 66.4 | 3.85 | 17.4 | 48.8 |
| 0.1N Bromine | 30 | 75.7 | 4.39 | 17.4 | 51.8 |
| 0.1N Bromine | 60 | 78.2 | 4.55 | 17.1 | 49.8 |
| 0.4N Bromine | 3 | 85.0 | 4.93 | 15.65 | 52.8 |
| 0.4N Bromine | 5 | 79.4 | 4.61 | 17.60 | 49.8 |
| 0.4N Bromine | 10 | 79.4 | 4.61 | 16.50 | — |
| 0.4N Bromine | 30 | 90.5 | 5.21 | 15.60 | 53.5 |
| 0.4N Bromine | 60 | 96.3 | 5.43 | 15.45 | 55.9 |
| All with dye carrier Levergal (0.6 g/l of dye bath): | | | | | |
| Blank | 0 | 17.2 | 1 | 29.25 | 33.9 |
| Saturated Chlorine | 3 | 39.7 | 2.30 | 23.50 | 43.0 |
| Saturated Chlorine | 5 | 38.5 | 2.23 | 23.20 | 45.7 |

TABLE 1-continued

| Halogen Concentration in Normality | Exposure Time in Minutes | % Dye in[a] Fabric | Dye Uptake Ratio to Blank | Luminescence[b] | Color Purity[c] |
|---|---|---|---|---|---|
| Saturated Chlorine | 10 | 52.1 | 3.02 | 20.05 | 49.8 |
| Saturated Chlorine | 30 | 63.3 | 3.68 | 18.85 | 45.0 |
| Saturated Chlorine | 60 | 94.9 | 5.49 | 16.60 | 49.5 |

[a]Dye uptake was measured by extracting the dyed fabric sample with refluxing chlorobenzene in a Soxhlet apparatus until the sample was decolorized. The extracted dye was determined spectrophotometrically.
[b] and [c]Determined in a photoelectric reflection photometer by the "Tristimulus Colorimetry" method (cf. Journal of the Society of Dyers and Colorists, Vol. 81, pp. 469-477 (1965). Luminescence is a measure of the whiteness of the fabric and decreases with increasing depth of the dyeing; it is inversely proportional to the Colour-Purity value.

EXAMPLE 2

A series of polyethylene and polypropylene films as well as fabrics woven from narrow untwisted film ribbons of these materials, about 3 mm wide and 0.76 mm thick, were treated with aqueous bromine solutions and, subsequently, with aqueous ammonia, substantially according to the procedure of Example 1. These samples, when observed under a microscope at 1000x magnification, also showed the formation of pores which were not present in the untreated blank samples.

The samples were then dyed by immersing them for one hour at 90° C. in a dye bath containing 3% (based on the textile) "Samaron Red BL", manufactured by Farbwerke Hoechst, Germany. The results are shown in the following Table II.

EXAMPLE 3

Samples of polyethylene terephthalate and polypropylene in yarn and ribbon form were treated according to the procedure of Example 1, with a saturated aqueous chlorine solution at various pH values, obtained by the addition of sulfuric acid.

The polypropylene samples were then dyed according to the procedure of Example 2 and the resulting dye uptakes are shown in Table III below, which also includes data relating to mechanical strength, elongation and water regain of all the treated samples. The water regain was measured by conditioning the samples for 24 hours at 20° C and 65% relative humidity and then weighing the conditioned sample. The sample was then dried at 105° C for one hour and the dry weight obtained.

TABLE II

| Bromine Concentration in Normality | Immersion Time in Minutes | % Dye in[a] Fabric | Dye Uptake Ratio to Blank | Luminescence[b] | Color Purity[c] |
|---|---|---|---|---|---|
| Polypropylene Films - 0.023 mm in thickness | | | | | |
| Blank | 0 | 1.76 | 1 | 22.20 | 6.3 |
| 0.14N | 15 | 7.8 | 4.44 | 15.45 | 15.8 |
| 0.14N | 30 | 9.6 | 5.46 | 14.85 | 19.0 |
| 0.32N | 5 | 31.2 | 17.68 | 11.9 | 24.5 |
| 0.32N | 15 | 37.6 | 21.35 | 13.15 | 29.0 |
| 0.32N | 60 | 68.6 | 38.92 | 12.55 | 28.8 |
| 0.39N | 5 | 34.5 | 19.71 | 9.7 | 29.3 |
| 0.39N | 30 | 41.16 | 23.35 | 12.9 | 29.8 |
| 0.39N | 60 | 76.0 | 43.14 | 9.6 | 36.1 |
| Polyethylene Films - A = 0.021 mm; B = 0.152 mm in thickness | | | | | |
| Blank A | 0 | 3.53 | 1.0 | 28.90 | 5.9 |
| 0.1N A | 15 | 21.56 | 6.11 | 12.10 | 16.2 |
| 0.1N A | 60 | 44.7 | 12.66 | 8.75 | 26.0 |
| 0.3N A | 15 | 67.46 | 18.99 | 7.95 | 23.0 |
| 0.3N A | 60 | 78.00 | 22.11 | 6.90 | 21.0 |
| Blank B | 0 | 6.46 | 1.00 | 17.40 | 7.8 |
| 0.1N B | 15 | 33.7 | 5.22 | 4.90 | 12.2 |
| 0.1N B | 60 | 38.4 | 5.94 | 5.00 | 16.0 |
| 0.3N B | 15 | 38.8 | 6.00 | 5.60 | 15.8 |
| 0.3N B | 60 | 86.26 | 13.34 | 5.90 | 10.2 |

[a], [b] & [c] See footnotes to Table I

TABLE III

| | Polymers — | Polyethylene terephthalate (polyester) 20 cm × 20 cm × 0.36 cm before treatment, after treatment 0.39 cm. Polypropylene yarn or woven ribbon — untwisted ribbon ⅛" wide × 0.76 mm before, 0.80 after treatment, swatch 20 cm × 20 cm. | | | | | |
|---|---|---|---|---|---|---|---|
| Sample Treated | pH of Chlorine Sol. | Extraction Time min. | Mechanical[b] Strength in kg/cm² | | % Elongation | % Water Regain | Dye Uptake[a] |
| | | | Polyethylene Terephthalate | | | | |
| Blank | — | 0 | B | 18.16 | | 0.35 | |
| | 0 | 5 | B | 14.66 | | 0.86 | |
| | 0 | 60 | B | 9.33 | | 1.12 | |
| | 2 | 5 | B | 18.0 | | 0.57 | |
| | 2 | 60 | B | 16.0 | | 0.97 | |
| | | | Polypropylene | | | | |
| Blank | | 0 | T | 3.986 | | 0.176 | 7 |
| Yarn | 0 | 5 | T | 3.890 | 37 | | 48 |
| Yarn | 2 | 5 | T | 3.728 | 38 | 0.38 | 35 |
| Yarn | 2 | 60 | T | 3.681 | 37 | 0.55 | 74.5 |
| Blank | — | 0 | — | — | — | 0.144 | 1.76 |
| Ribbon | 0 | 5 | T | 4.983 | 18 | 0.32 | 27.8 |

TABLE III-continued

| | | | Polymers — | Polyethylene terephthalate (polyester) 20 cm × 20 cm × 0.36 cm before treatment, after treatment 0.39 cm. Polypropylene yarn or woven ribbon — untwisted ribbon ⅛" wide × 0.76 mm before, 0.80 after treatment, swatch 20 cm × 20 cm. | | | |
|---|---|---|---|---|---|---|
| Sample Treated | pH of Chlorine Sol. | Extraction Time min. | Mechanical[b] Strength in kg/cm² | % Elonga-tion | % Water Regain | Dye Uptake[a] |
| Ribbon | 0 | 60 | T  4.670 | 16 | 0.55 | 28.4 |
| Ribbon | 2 | 5 | T  4.625 | 15 | 0.25 | 31.4 |
| Ribbon | 2 | 60 | T  4.076 | 17 | 0.53 | 41.6 |

[a] cf. Table I
[b] T = Tensile Strength
B = Bursting Strength

The results in Table III show, inter alia, that at a pH 0 of the chlorine containing solution, water regain is increased, as compared to results at pH 2. The mechanical strength of the samples treated at pH 0 is somewhat reduced, though not in an unacceptable degree.

EXAMPLE 4

Polyvinyl chloride yarns were immersed in aqueous 0.2N bromine solutions for contact times of 15, 30 and 60 minutes. Thereafter the yarns were immersed in concentrated aqueous ammonium hydroxide solutions for 20 seconds whereupon the bromine-brown yarns were completely decolorised. The yarns were then dyed in a dye bath containing 3% (based on the textile) of Palanil "Brilliant Rot" using 3% of "Levergal" (cf. Example 1). A comparison with a blank sample submitted to an identical dyeing process provided that the dyeing of the PVC yarns which had been treated as described above, was decidedly improved.

EXAMPLE 5

Nylon yarns were submitted to the same treatment as described in Example 4, except that the concentration of the aqueous bromine solution was reduced to 0.03N. The results of microscopic examination and dyeing experiments were substantially the same as in Example 4 above.

EXAMPLE 6

The procedure of Example 1 was repeated using the following samples: Polyisobutylene sheet, polystyrene film, polyacrylonitrile fibers, cellulose triacetate film, polycaprolactam fibers, polyhexamethylene adipamide (nylon) yarn, polyvinyl chloride yarn and polyvinylidene chloride yarn.

Four series of experiments were conducted with each of the above listed samples using, respectively, aqueous chlorine and bromine solutions in the first stage of the procedure of Example 1 and aqueous ammonia and formic acid solutions in the third stage of the process. Comparisons were made in each case with an untreated blank and it was found by dyeing according to the procedure described in Example 1, that the treated polymer samples, as compared with the blank samples, exhibited improved dyeability.

EXAMPLE 7

Examples of polyethylene terephthalate knitted fabrics, identical with those used in Example 1, were treated first with a saturated aqueous bromine solution and thereafter with aqueous ammonium hydroxide solution according to the procedure of Example 1. The samples were then soaked in water containing 1% of musk oil in a dispersed state, and left in contact with the dispersion for one hour under continuous stirring. The samples were then drained, rinsed with water and dried in air. The fabric samples had a marked musk odour which was retained even after the samples were washed in a dilute detergent solution and dried. A blank sample of fabric was similarly immersed in the aqueous musk oil dispersion, without having priorly undergone the treatment with the bromine solution and with the ammonia solution according to the invention. It was found that, after a single washing in a dilute detergent solution, the blank sample lost all the musk odour.

EXAMPLE 8

A sample of polypropylene fabric weighing 1 g was treated with a concentrated aqueous bromine solution and thereafter with aqueous ammonia according to the procedure of Example 1. The washed and dried sample was then immersed for one hour in a solution of 0.5 g of nitrofuryl-acrolein dissolved in 25 ml of 30% aqueous ethyl alcohol at 60° C. The sample was then removed from the solution, washed with water and dried. A blank sample of identical polypropylene fabric was similarly treated with the same alcoholic solution of nitrofuryl-acrolein, washed with water and dried. Both samples were analysed for nitrogen content and while the blank showed 0% nitrogen, the sample which had previously been treated with aqueous bromine and aqueous ammonia solutions was found to contain 7% nitrogen.

The aforesaid nitrogen-containing sample was immersed in a 2% solution of aminohydantoin in 50% methanol and kept therein for one hour at 80° C. Nitrofuryl-acrolein is known to undergo a condensation reaction with aminohydatoin under these conditions to form a bactericide which is known, for example, in Russia as "Furagin". Nitrogen analysis of the sample showed a nitrogen content of 10.4% which, when compared with the original 7% nitrogen content, was consistent with the formation of the known condensation products.

EXAMPLE 9

A sample of knitted polyethylene terephthalate fabric weighing 3 g was immersed for 10 minutes at room temperature in an aqueous solution containing 8% of sodium hypochlorite. The sample was removed from the solution, drained and while still wet with the hypochlorite solution, immersed in a 4% aqueous hydrochloric acid solution for 15 minutes. The sample was thereafter removed from the acid solution, drained, washed with water and immersed in a 24–28% aqueous ammonium hydroxide solution for 20 seconds. The sample was removed from the solution, drained, washed with water and air dried.

The sample, as well as an untreated blank sample, were dyed with "Palanyl Brilliant Rot BEL", without a dye carrier, according to the procedure of Example 1. The dye uptake of the treated sample was found to be four times that of the blank sample.

EXAMPLE 10

A sample of knitted polyethylene terephthalate was immersed for 10 minutes at room temperature in a saturated aqueous chlorine solution at pH 2. The sample was removed from the solution, drained and washed with water and thereafter immersed in an aqueous solution containing 5% of sodium bisulfite. The sample was removed from the bisulfite solution, drained, washed with water and air dried.

The sample, as well as a blank one, were dyed as described in Example 9. Substantially the same results as in Example 9 were obtained.

We claim:

1. A method of improving the sorption capacity of a substantially hydrophobic, thermoplastic polymer, which comprises:
   a. introducing into said polymer a halogen selected from the group consisting of $Cl_2$, $Br_2$, $I_2$, ClI, ClBr, and BrI by contacting the polymer with a solution containing said halogen under conditions which avoid chemical reaction of said halogen with said polymer;
   b. separating the free halogen containing polymer from said solution; and
   c. contacting said polymer with a reagent capable of pervading the polymer and reacting with the free halogen contained therein so as to produce a gas as one of the reaction products, thereby producing said gas.

2. A method according to claim 1, wherein the halogen is introduced in step $a$ in the form of an aqueous solution.

3. A method according to claim 2, wherein the pH of the aqueous solution is between 0 and 3.

4. A method according to claim 1, wherein said polymer is potentially susceptible to chemical attack by said halogen in the presence of light and steps $a$, $b$ and $c$ are carried out in the dark.

5. A method according to claim 1, wherein step $c$ is carried out at a temperature of from about 50° C to about 80° C.

6. A method according to claim 1, wherein the reagent used in step $c$ is ammonia.

7. A method according to claim 1, wherein the reagent used in step $c$ is dissolved in water.

8. A method according to claim 1, wherein the polymer is selected from the group consisting of polyolefins, polyesters, polystyrene, polyacrylonitrile, polycaprolactam, polyhexamethylene adipamide, polyvinyl chloride, polyvinylidene chloride, cellulose triacetate, and copolymers and terpolymers thereof.

9. A method according to claim 1, wherein the polymer is in a form of a film, a sheet, fibers, a yarn, knitted fabric, woven fabric, non-woven fabric, or granules.

10. A method according to claim 1, comprising the additional step of subjecting the polymer after the completion of step $c$ to a temperature of from 50° C to 80° C.

11. A method according to claim 1 wherein said gas produced is selected from the group consisting of nitrogen, carbon dioxide, oxygen, sulfur dioxide, sulfur trioxide, hydrogen chloride, and hydrogen sulfide.

12. A process for dyeing a substantially hydrophobic, thermoplastic polymer, which comprises treating said polymer prepared by the method of claim 1 and subsequently dyeing the polymer with a dye system selected from the group consisting of aqueous dispersed and basic dye systems.

13. A method for the production of a composite product comprising a polymer having increased sorption capacity, and sorbed thereon at least one material imparting to the product desired properties, which comprises:
   a. introducing into said polymer a halogen selected from the group consisting of $Cl_2$, $Br_2$, $I_2$, ClBr, ClI and BrI by contacting the polymer with a solution containing said halogen under conditions which avoid chemical reaction of said halogen with said polymer;
   b. separating the free halogen containing polymer from said solution;
   c. contacting said polymer with a reagent capable of pervading the polymer and reacting with the free halogen contained therein so as to produce a gas as one of the reaction products, thereby producing said gas; and thereafter
   d. contacting the thus treated polymer with at least one said property imparting material under controlled conditions to sorb each said material on the polymer.

14. A method for the production of a composite product comprising a substantially hydrophobic, thermoplastic polymer having increased sorption capacity, and sorbed thereon at leat one material imparting to the product desired properties, which comprises:
   a. introducing into said polymer a halogen selected from the group consisting of $Cl_2$, $Br_2$, $I_2$, ClBr, ClI and BrI by contacting the polymer with a solution containing said halogen under conditions which avoid chemical reaction of said halogen with said polymer;
   b. separating the free halogen contacting polymer from said solution;
   c. contacting said polymer with a reagent capable of prevading the polymer and recting with the free halogen contained therein so as to produce a gas as one of the reaction products thereby producing said gas; thereafter contacting the treated polymer with at least one substance to sorb each said substance on the polymer, each said substance being capable by itself or by reaction with other substances of chemical conversion in situ into said desired property imparting material carrying ot said chemical conversion for each said property imparting material.

15. A method according to claim 14 wherein said gas produced is selected from the group consisting of nitrogen, carbon dioxide, oxygen, sulfur dioxide, sulfur trioxide, hydrogen chloride and hydrogen sulfide.

* * * * *